(12) United States Patent
Chutter

(10) Patent No.: US 9,598,144 B1
(45) Date of Patent: Mar. 21, 2017

(54) AERODYNAMICALLY BUOYANT SAILCRAFT

(71) Applicant: Richard Chutter, Round Pond, ME (US)

(72) Inventor: Richard Chutter, Round Pond, ME (US)

(*) Notice: Subject to any disclaimer, the term of this patent is extended or adjusted under 35 U.S.C. 154(b) by 0 days.

(21) Appl. No.: 15/178,594

(22) Filed: Jun. 10, 2016

(51) Int. Cl.
 B63B 35/00 (2006.01)
 B63B 1/32 (2006.01)
 B63H 9/04 (2006.01)

(52) U.S. Cl.
 CPC ............... *B63B 1/322* (2013.01); *B63H 9/04* (2013.01)

(58) Field of Classification Search
 CPC .... B63B 1/00; B63B 1/16; B63B 1/18; B63B 1/20; B63B 1/322; B63B 2001/00; B63B 2001/16; B63B 2001/18; B63B 2001/183; B63B 2001/32; B63B 2001/327; B63H 9/00; B63H 9/04; B63H 9/06; B63H 9/08; B63H 2009/00; B63H 2009/04; B63H 2009/06; B63H 2009/0607; B63H 2009/0621; B63H 2009/0657; B63H 2009/08
 USPC ......... 114/39.21, 39.22, 39.24, 39.25, 39.29, 114/39.31, 39.32, 271, 272, 273, 274, 114/275, 278, 280, 282, 283, 284, 285
 See application file for complete search history.

(56) References Cited

U.S. PATENT DOCUMENTS

| | | | | |
|---|---|---|---|---|
| 3,966,143 A * | 6/1976 | Smith | ..................... | B64C 31/02 114/272 |
| 4,080,922 A * | 3/1978 | Brubaker | .................. | B63B 1/30 114/282 |
| 4,601,443 A * | 7/1986 | Jones | ................... | B64D 17/025 244/13 |
| 4,739,957 A * | 4/1988 | Vess | .......................... | B64C 9/34 244/199.1 |
| 6,341,571 B1 * | 1/2002 | Russell | .................... | B63B 1/125 114/102.1 |
| 7,252,264 B2 * | 8/2007 | Nattinger | ............. | B63H 9/0607 114/39.21 |
| 2003/0101919 A1 * | 6/2003 | Stevens | ................. | B62B 15/002 114/272 |

* cited by examiner

*Primary Examiner* — Daniel V Venne
(74) *Attorney, Agent, or Firm* — Buchanan Ingersoll & Rooney PC

(57) ABSTRACT

A vehicle includes a frame having an elongated shape extending in a longitudinal direction, a canard airfoil mounted to a forward portion of the frame, a wing airfoil mounted to an aft portion of the frame, a mast mounted to the frame, at least one sail supported by the mast, and a support rotatably mounted to the mast and supporting a cabin and/or equipment, and a plurality of support devices attached to one or more of the frame or the wing airfoil to stabilize and support the vehicle when stopped or at low speeds and to provide directional control. The canard airfoil is adjustable to thereby change the amount of lift provided to the forward portion of the frame, and the wing airfoil is adjustable to provide lift and to balance the forces on the vehicle.

10 Claims, 4 Drawing Sheets

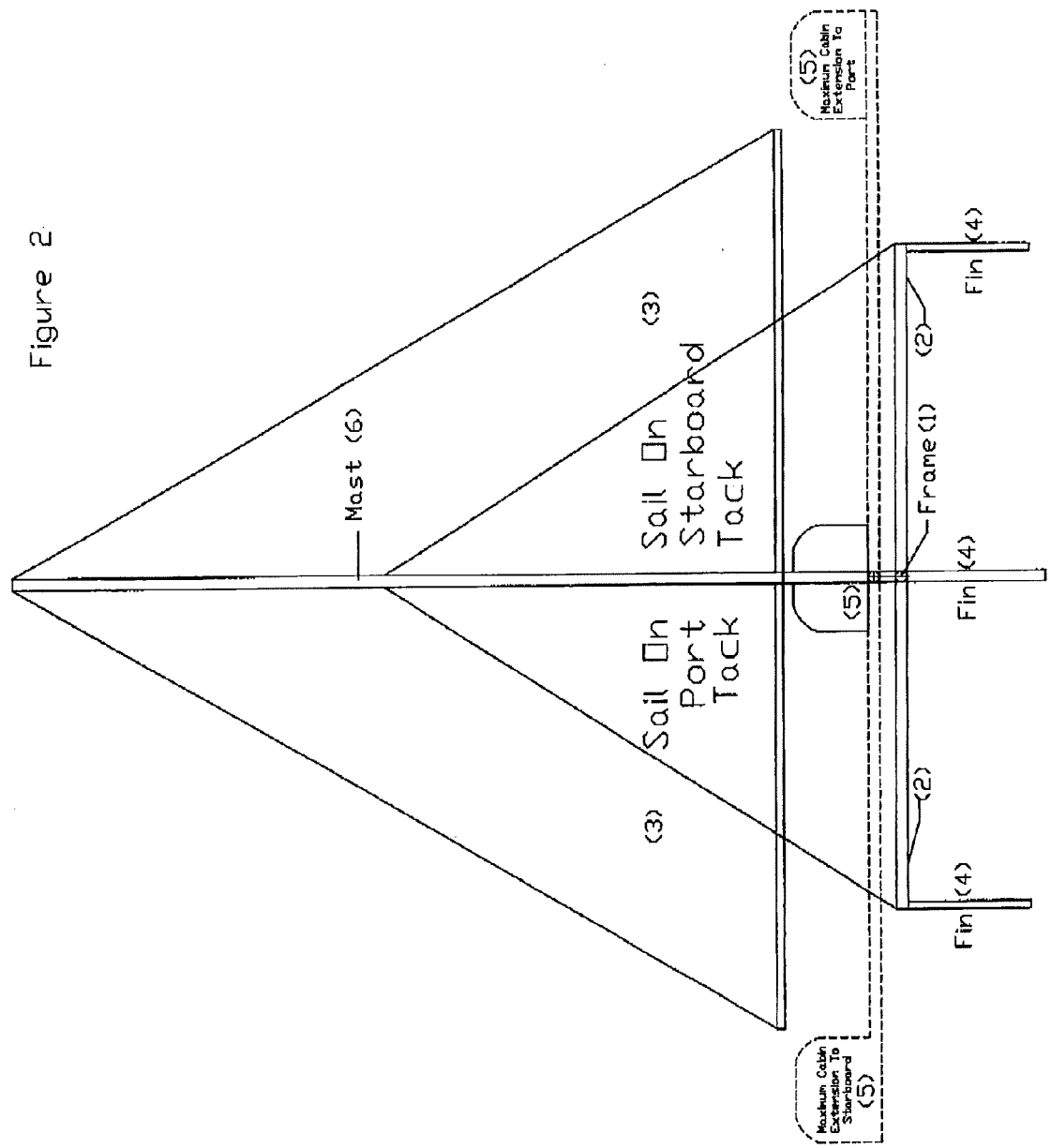

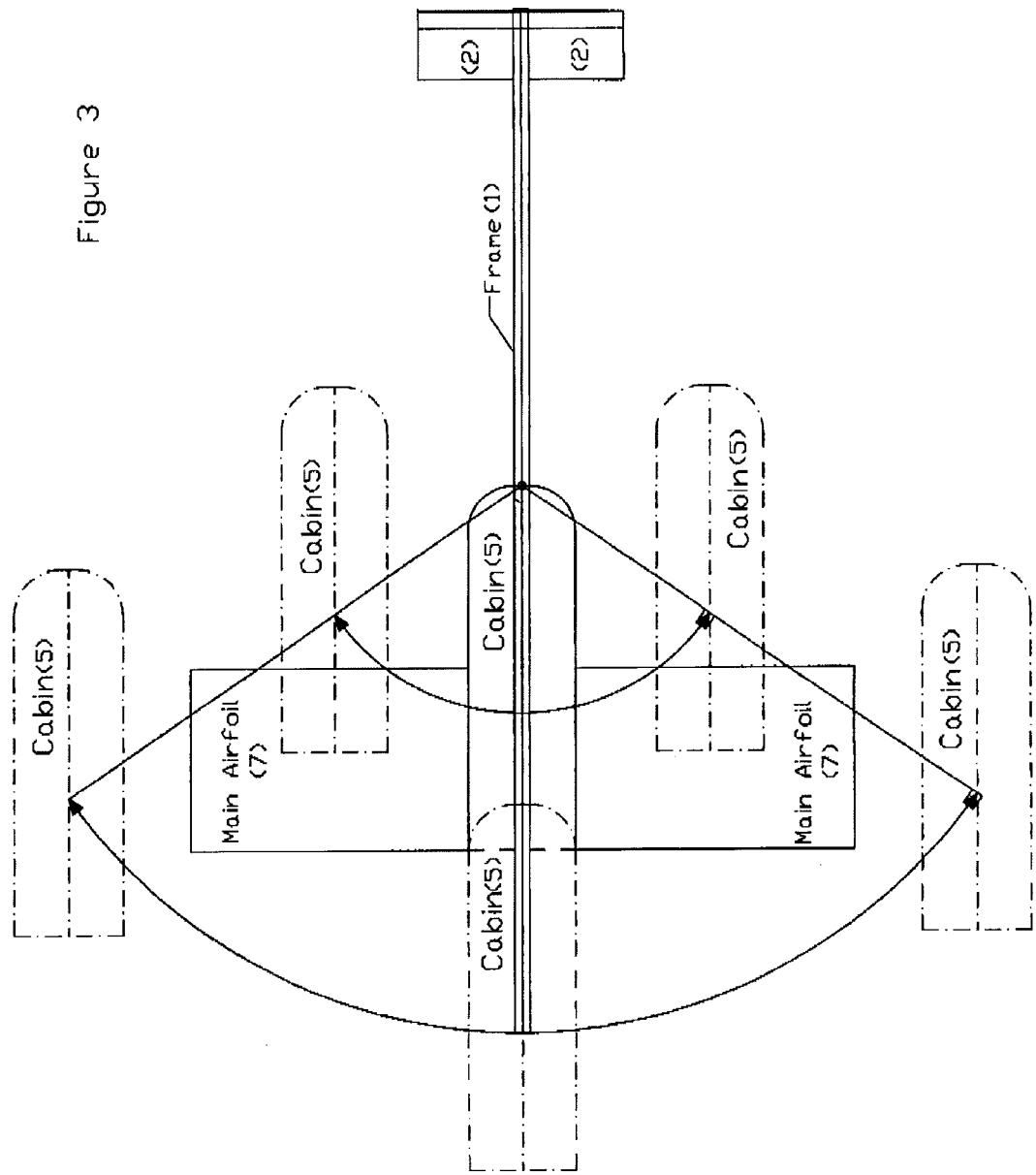

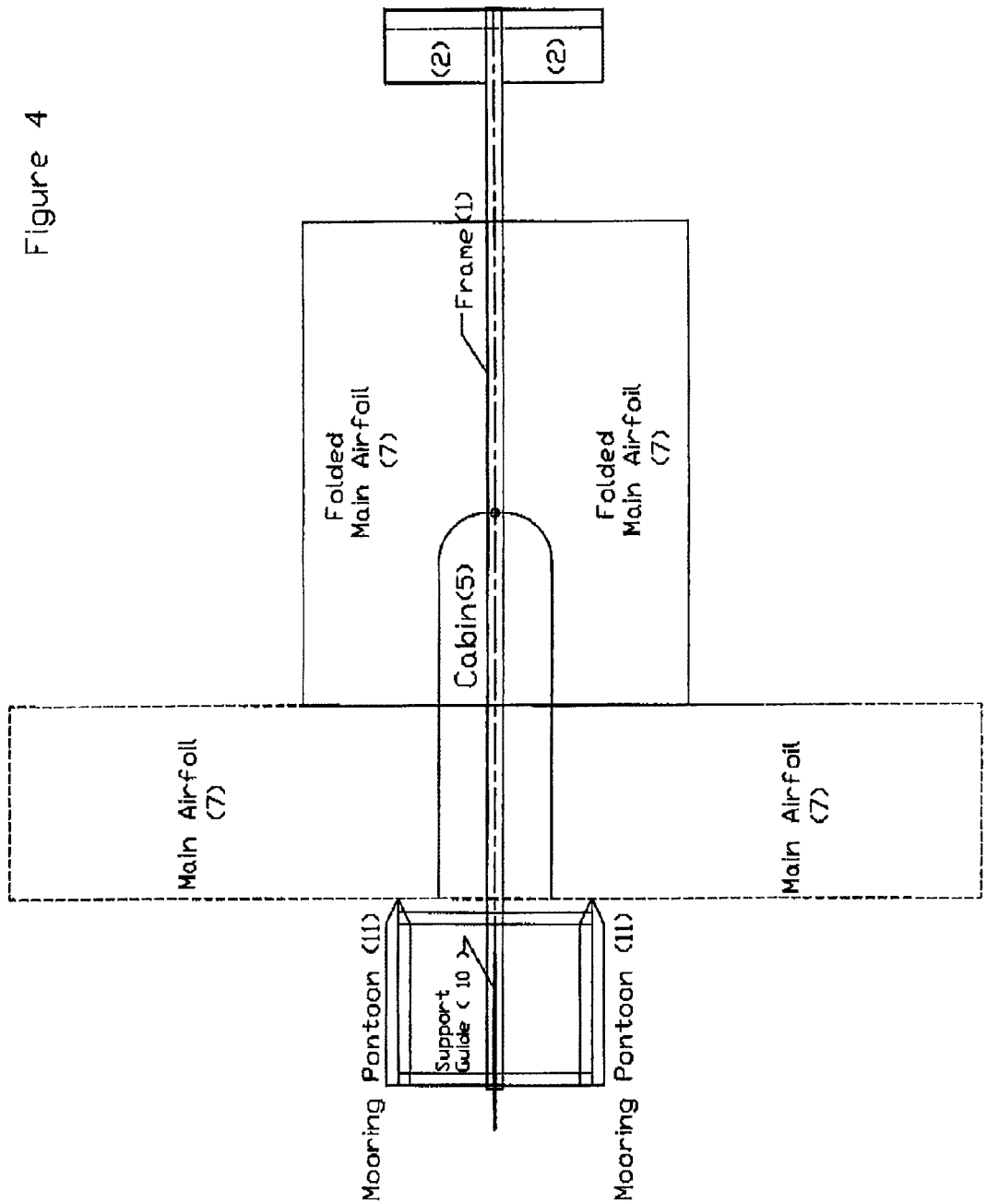

AERODYNAMICALLY BUOYANT SAILCRAFT

TECHNOLOGICAL FIELD

Figure 1:
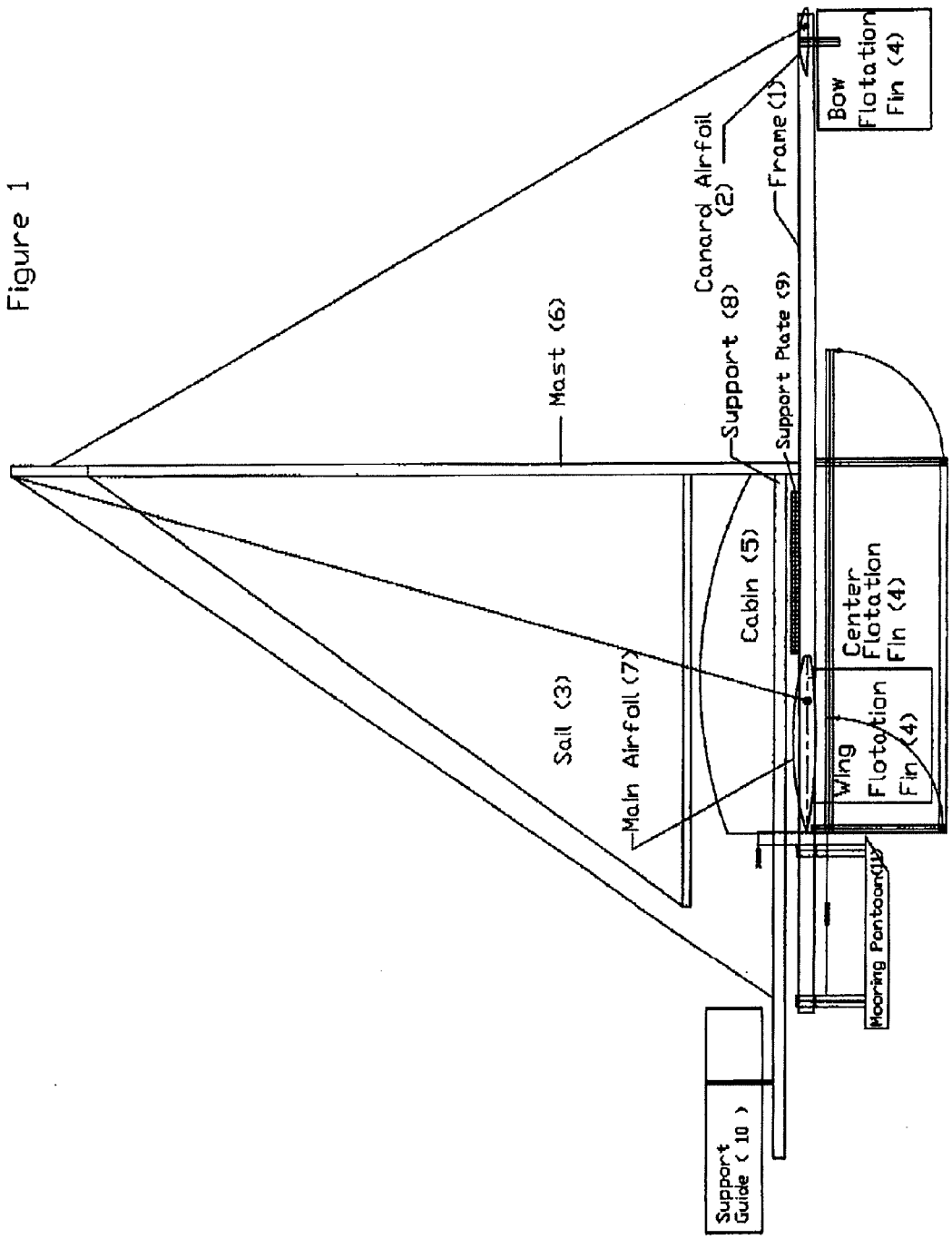

The present invention relates generally to an aerodynamically buoyant sailcraft and particularly to a sailcraft having a frame, a canard airfoil, a wing airfoil, a mast supporting a sail, a support rotatably mounted to the mast and supporting a cabin or equipment, and a plurality of support devices attached to one or more of the frame or the wing airfoil to stabilize and support the vehicle when stopped or at low speeds and to provide directional control.

BACKGROUND DISCUSSION

In conventional sailcraft, the necessary buoyancy is provided by submergence of a portion of the hull in the water such that the hull also acts as a flotation device. Moreover the heavier the craft, the more water will have to be displaced and thus more water will have to be moved as the craft moves forward. However, water is relatively heavy and it takes energy to move the water out of the way in order for the boat to be able to move through the water. As the speed of the craft increases, disproportionately more energy is needed to move the water away. Furthermore, the forces on the craft from the wind and the water can be unbalanced, resulting in further unnecessary drag. A need therefore exists for a sailcraft in which the drag effects of the water can be greatly reduced while the boat itself remains sufficiently buoyant.

SUMMARY

In a sailcraft according to this application configured specifically as a sailboat, the buoyancy of the sailcraft is transferred mainly to a set of airfoils, to thereby minimize the drag of the vehicle going through the water especially at higher speeds. Fins are attached to the frame or to the wing airfoil to provide both buoyancy and directional control. Furthermore, by providing for the support for the cabin or equipment to be rotatable around and movable towards and away from the mast, the forces on the craft can be further balanced.

In an embodiment, the vehicle includes a frame having an elongated shape extending in a longitudinal direction, a canard airfoil mounted to a forward portion of the frame, a wing airfoil mounted to an aft portion of the frame, a mast mounted to the frame, at least one sail supported by the mast, and a support rotatably mounted to the mast and supporting a cabin and/or equipment, and a plurality of support devices attached to the frame to stabilize and support the vehicle when stopped or at low speeds and to provide directional control. The canard airfoil is adjustable to thereby adjust an amount of lift provided to the forward portion of the frame, and the wing airfoil is adjustable to provide lift and to balance the forces on the vehicle.

In an embodiment, the mast is mounted to the frame between the forward portion and the aft portion in the longitudinal direction.

In an embodiment, the cabin and/or equipment is movable along the support in a direction toward or away from the mast thereby varying the front-to-back distance between the cabin and/or equipment and the mast, and the side-to-side distance between the cabin and/or equipment and the mast, to further balance the forces on the vehicle.

In an embodiment, the cabin or equipment is free to move into the relative wind.

In an embodiment, the canard airfoil is provided with a control system which automatically controls the canard airfoil to provide a constant amount of lift to the forward portion or to maintain a constant physical position of the forward portion with respect to a reference plane.

In an embodiment, the wing airfoil includes a pair of wings which are individually adjustable to provide differing amounts of lift. Furthermore, the wings can be rotated so as to minimise the area occupied by the craft.

In an embodiment, a support guide or rudder to move the cabin and/or equipment and the support from side to side is provided.

BRIEF DESCRIPTION OF THE DRAWING FIGURES

Additional features and aspects of the aerodynamically buoyant sailcraft disclosed here will become more apparent from the following detailed description considered with reference to the accompanying drawing figures in which like elements are designated by like reference numerals.

FIG. 1 is a side view of the sailcraft.
FIG. 2 is a front view of the sailcraft.
FIG. 3 is a top view of the sailcraft.
FIG. 4 is a top view of the sailcraft with the wings in a folded position.

DETAILED DESCRIPTION

An embodiment in which the sailcraft is a sailboat is illustrated in FIGS. 1-4. The sailcraft includes a frame 1 having an elongated shape extending in a longitudinal direction, a canard airfoil 2 mounted to a forward portion of the frame, a wing airfoil 7 mounted to an aft portion of the frame, a mast 6 mounted to the frame, a sail 3 supported by the mast, and a support 8 rotatably mounted to the mast and supporting a cabin 5. The design configuration and materials used in the construction of the components of the vehicle are characterized by light weight, strength, stiffness and corrosion resistance. Examples are fiberglass, marine aluminum, carbon fiber and newer materials as they come on line.

In an embodiment, the canard airfoil 2 is rotationally mounted to the front of the frame 1, i.e., at the bow of the boat, such that its angle of attack is adjustable by the pilot to thereby change an amount of positive or negative lift provided to the bow end of the frame 1. The canard airfoil 2, together with the main airfoil 7, which is discussed in detail below, in combination, provide sufficient lift to minimize the drag of the craft moving through the water, such that only the fins, which are discussed in detail below, engage the water.

In an embodiment, the wing airfoil 7 is mounted to the frame 1 and provides support for the whole structure including people and/or equipment. Furthermore, the wing airfoil 7 includes a pair of wings which can be either collectively adjustable or individually adjustable to provide differing amounts of lift. In the embodiment, each wing can rotate about the spar or be fixed and have flaps and ailerons to change the lift on the wings which can be, for example, electrically, hydraulically, or cable controlled using mechanisms conventionally found in aircraft. The spar can be made, for example, of aluminum or carbon fiber or any high-strength stiff material that is also corrosion free for the environment. The wings can be made of any suitable material and are preferably buoyant. In an alternative embodiment, part of each wing is fixed, and the trailing edge can act as a flaperon (combination flap and aileron), thereby allowing the airfoil in the alternative embodiment to be adjustable.

The sail or sails 3 can be a traditional soft sail, a hard surfaced airfoil or a combination of hard and soft sail, and can be attached to the mast 6 in a known manner. The mast 6 is held in position by at least three wires—one to the bow area and two to each wing, and supports the cabin 5 as discussed in detail below. The sail 3 is the motivating force that propels the craft forward. A prop motor or the like could be provided, for used in an emergency or when the wind not practical to use, to propel the vehicle.

In an embodiment, the wing airfoil 7 stays horizontal or is mounted with a dihedral and the sail 3 stays vertical. In an alternate embodiment, one of the wings of the wing airfoil 7 is horizontal while the second is in a vertical position on a particular tack, thereby acting as the sail 3, and on the other tack the roles are switched. For example, what was vertical on one tack will become horizontal and the horizontal will become vertical on the next tack. Thus on one tack one airfoil becomes the main wing and the other becomes the sail, while when on a different tack the roles are reversed.

In an embodiment, a plurality of support devices 4, each of which can include a fin, for example, when the sailcraft is a sailboat, are attached to the frame 1 and/or the wing airfoil 7 to stabilize and support the vehicle when stopped or at low speeds. These support devices can be made of at least two components, a rigid component and a flexible component. The rigid component gives the supporting device its shape while the flexible component changes the device's degree of support. The flexible material can be inflated to provide buoyancy when there is not sufficient lift from the airfoils. There can also be a separate third component which is a material that protects the flexible material, or the protective component can be combined with the flexible component.

When the sailcraft is a sailboat, there can be four such devices, one on each wing of the wing airfoil 7, one at the center of the frame 1, and one at the bow of the frame 1 near the canard airfoil 2. The devices 4 are deployed when the craft is stopped or at slow speeds. At higher speeds, the flexible components of the devices 4 can be deflated or moved up and out of the water and to a height sufficient to avoid most wave action. The rigid components of the devices 4 are preferably relatively narrow, i.e., fins, in order to deal with the higher speeds as the vehicle accelerates but before it reaches a velocity at which they can be retracted.

The fin of the device 4 at the bow of the frame can provide directional control. The fins of the remaining devices 4 (i.e., one at each wing of the wing airfoil 7 and one at the center of the frame 1) provide stability and help prevent the craft from moving down wind. Furthermore, as discussed in more detail below, in alternative embodiments in which the vehicle is not a boat, the devices 4 can take other configurations, such as skis, wheels, or skates, and fewer such devices 4 may be needed.

The cabin 5 supports the crew and passengers (or, in a drone embodiment, equipment) and can be moved from side to side and front to back along the support. In one configuration, in order to balance the wind loads, the cabin 5 is mounted to a support 8 which can rotate around the mast 6, and the cabin 5 itself can move along the support 8 toward the mast 6 or away from the mast 6. In such an embodiment, the mast 6 can support the cabin 5 using a collar at one end and a guy wire at the other end or a roller mechanism can support the cabin area. In addition, the wing airfoil 7 can also support the cabin 5. The cabin 5 itself can rotate on a plate so it heads into the relative wind to reduce drag. The cabin 5 can be all enclosed or can be open to the air. The side-to-side movement of the support 8 can be controlled by, for example, a pulley system attached to each wing and the support 8. Such a pulley system constitutes an example of a support guide for moving the cabin and/or equipment and the support from side to side. Alternatively, a rudder 10 can be attached to the support to move the support 8 and the cabin 5 from side to side. Similarly, the fore and aft movement of the cabin 5 along the support 8 can be accomplished by a pulley system attached to both ends of the support and the cabin.

In the embodiment, the support 8 is a rail that is connected at one end to the mast 6 and at the other to a wire attached to the top of the mast. In addition, the support rail and thus the cabin can be supported by a roller that moves on top of the wing airfoil 7. Alternatively, the vehicle can be provided with a support plate 9, with the support rail and thus the cabin being be supported by a roller that moves on top of the support plate 9.

As illustrated in FIG. 3, the cabin 5 can thus move towards the mast 6 or away from the mast 6, and can move in an arc around the mast 6, and at the same time the cabin 5 will rotate to stay parallel to the centerline of the craft or the relative wind. The rotation of the cabin 5 around the mast 6, as well as the movement of the cabin 5 along the support, will vary the distance of the cabin 5 from the longitudinal axis of the vehicle defined by the frame 1, and can allow for greater moment forces to be applied than could be achieved simply by movement of the crew as is done in conventional sailboats.

Furthermore, in an embodiment, elevators on the trailing edge of the canard airfoil 2 can be configured to be automatically adjustable to thereby maintain the bow's position in space. The angle of attack of the canard airfoil 2 and its elevators can be, for example, electrically, hydraulically, or cable controlled using mechanisms conventionally found in aircraft. Using one or more sensors (for example, a gyroscope mounted to the bow of the frame 1) which detect the physical position of the bow of the frame 1 with respect to a reference plane, a feedback control system can be provided for automatic control of the elevator of the canard airfoil to provide a constant amount of lift and/or maintain a constant physical position of the frame 1 with respect to the reference plane. In other words, the operator, with the gyroscope off, can pick the bow up or down by changing the angle of attack of the canard airfoil 2, for example, by a pilot-controlled actuator. After the pilot has made the adjustment, the pilot will engage or re-engage the gyroscope, and then the gyroscope will sense any changes to the bow position and deflect elevators on the trailing edge of the canard airfoil 2, for example, by a sensor-controlled actuator, to return the bow to its new position. The gyro and associated mechanisms will therefore reduce the workload of the operator and lead to greater stability of the vehicle.

The detailed description above describes features and aspects of embodiments of a sailboat disclosed by way of example. The invention is not limited, however, to the precise embodiments and variations described. Changes, modifications and equivalents can be employed by one skilled in the art without departing from the spirit and scope of the invention as defined in the appended claims. It is expressly intended that all such changes, modifications and equivalents which fall within the scope of the claims are embraced by the claims. For example, instead of a sailboat, the above-described features can be modified and applied to other types of sailcrafts. For example, for a craft designed to travel over ice, snow, sand, or the ground, the support devices can instead be one or more of skis, wheels, or skates, and the center device may not be needed in such embodiments, (for example, with the devices only be provided at the bow and at each wing), since the center support device of the sailboat embodiment is provided mostly for added buoyancy. Furthermore, for soft surfaces such as snow or sand, the canard airfoil and main airfoil will be useful for preventing the skis or wheels from sinking into the soft surface. Furthermore, the frame of the device can be configured such that different types of support devices can be swapped at the mounting points. For example, a user could mount fins to the craft so that it can be used on the water during warmer weather, and then swap out the fins for skis or skates for winter use of the craft on ice or snow, thus allowing the craft to be used year-round on different surfaces.

What is claimed is:

1. A vehicle for carrying one or more of passengers or material over a surface, said vehicle comprising:
   a frame extending in a longitudinal direction;
   a canard airfoil mounted to a forward portion of the frame;
   a wing airfoil mounted to an aft portion of the frame;
   a mast mounted to the frame;
   at least one sail supported by the mast; and
   a support rotatably mounted to the mast and supporting a cabin;
   wherein the canard airfoil is adjustable to thereby change an amount of lift provided to the forward portion of the frame; and
   wherein the wing airfoil is adjustable to provide lift and to balance forces on the vehicle.

2. The vehicle of claim 1, wherein the mast is mounted to the frame between the forward portion and the aft portion in the longitudinal direction.

3. The vehicle of claim 1, wherein
   the cabin is movable along the support in a front-to-back and a side-to-side direction toward or away from the mast to thereby vary a distance between the cabin and the mast, and the support can rotate about the mast, to further balance the forces on the vehicle.

4. The vehicle of claim 1, wherein the cabin is free to move into a relative wind.

5. The vehicle of claim 1, wherein the canard airfoil is provided with a control system which automatically controls the canard airfoil to provide a constant amount of lift to the forward portion or to maintain a constant physical position of the forward portion with respect to a reference plane.

6. The vehicle of claim 1, wherein the wing airfoil includes a pair of wings which are individually adjustable to provide differing amounts of lift to the vehicle.

7. The vehicle of claim 6, wherein the pair of wings can be rotated so as to minimise an area occupied by the vehicle.

8. The vehicle of claim 1, further comprising a support guide or rudder to move the cabin and the support from side to side.

9. The vehicle of claim 1, further comprising a plurality of support devices attached to one or more of the frame or the wing airfoil to stabilize and support the vehicle when stopped.

10. The vehicle of claim 9, wherein the plurality of support devices comprise a plurality of fins.

* * * * *